United States Patent [19]

Malcolm

[11] Patent Number: 5,675,725
[45] Date of Patent: Oct. 7, 1997

[54] COMPUTER BACKUP SYSTEM OPERABLE WITH OPEN FILES

[75] Inventor: Peter B. Malcolm, Devon, United Kingdom

[73] Assignee: Cheyenne Advanced Technology Limited, London, England

[21] Appl. No.: 465,925

[22] Filed: Jun. 6, 1995

Related U.S. Application Data

[63] Continuation-in-part of Ser. No. 93,386, Jul. 19, 1993, Pat. No. 5,546,534.

[30] Foreign Application Priority Data

Mar. 23, 1995 [GB] United Kingdom .................. 9505939

[51] Int. Cl.⁶ ........................................................ G06F 11/00
[52] U.S. Cl. ................................... 395/182.04; 364/268.2
[58] Field of Search ............................. 395/182.04, 425, 395/450; 364/260.2, 268.7, 268.2, 282.1

[56] References Cited

U.S. PATENT DOCUMENTS

| | | | |
|---|---|---|---|
| 4,686,620 | 8/1987 | Ng ................................... | 364/200 |
| 5,065,354 | 11/1991 | Jons et al. ......................... | 395/575 |
| 5,163,148 | 11/1992 | Walls ................................ | 395/600 |
| 5,241,669 | 8/1993 | Cohn et al. ....................... | 395/575 |
| 5,241,670 | 8/1993 | Eastridge et al. ................. | 395/575 |

FOREIGN PATENT DOCUMENTS

| | | | |
|---|---|---|---|
| 0 566 968 A2 | 10/1993 | European Pat. Off. ........ | G06F 11/14 |
| 0 566 964 A2 | 10/1993 | European Pat. Off. ........ | G06F 11/14 |
| 2 230 626 | 10/1990 | United Kingdom ............ | G06F 15/40 |
| WO 91/01026 | 1/1991 | WIPO ............................. | G06F 15/40 |
| WO 93/08529 | 4/1993 | WIPO ............................. | G06F 11/14 |

OTHER PUBLICATIONS

Peter G. Galvin, "Operating System Concepts", pp. 373-379, 1994.

Primary Examiner—Vincent P. Canney
Attorney, Agent, or Firm—Fish & Richardson P.C.

[57] ABSTRACT

A backup program for a computer system with a hard disk maintains a record of changes made to the data in a file being backed up. During backup both the original and update file portions or records are stored, and the backup program reads the original data while other applications read the updated data. To identify whether a read operation is initiated by the backup program or by another application, the system determines, using the stack, the source of the read request. Alternatively it interrogates the user, process or task id. Access to the file by the backup program is guaranteed by manipulating the System File Table. It is ensured that the file is in a 'good' state by delaying the start of the backup operation for a predetermined period.

20 Claims, 4 Drawing Sheets

COMPUTER BACKUP SYSTEM OPERABLE WITH OPEN FILES

CROSS-REFERENCE-TO RELATED APPLICATION

This application is a continuation-in-part of my U.S. patent application Ser. No. 08/093,386 filed Jul. 19, 1993, now U.S. Pat. No. 5,546,543.

BACKGROUND OF THE INVENTION

This invention relates to a method of operating a computer system, and in particular to a method of providing backup copies of data stored in a storage device to guard against the possibility of the storage device becoming faulty or the data becoming corrupted, lost, or infected by a computer virus. The invention is especially concerned with the provision of backups for personal computers (PCs).

Conventionally, in a simple, single-user computer system comprising storage means such as a hard or fixed disk, only one application program has access to the storage means at any given time. The task of backing up data stored by the storage means is carried out by an application program which will have exclusive use of the storage means while carrying out the backup operation, since in such an environment no other application can operate until the backup application terminates.

With the introduction of multi-tasking environments which allow several applications to operate simultaneously, and of network systems, which allow several users to share the same resources, a situation may arise where more than one application has concurrent access to the same storage means. When this situation arises, there is a possibility of conflict between the applications. For example, one application might modify or delete a file currently being used by another application. This would lead to confusion and potentially to corruption of the storage means and consequently to loss of data.

Methods known as "file locking" and "record locking" have been introduced into operating systems to avoid, in the case of file locking, more than one application writing to a file or, in the case of record locking, two applications modifying the same area of a given file. These methods are sophisticated enough for most applications, particularly if each application only makes relatively minor changes to files which are shared and therefore does not significantly delay other applications wishing to access a file or record which is locked. However, an application for periodically backing up data in a computer system where the storage means are shared, is a special case.

The smallest unit of data which can be backed up is a single file, since neither the backup application nor the operating system has knowledge of the internal structure of a file because it could be associated with any application program.

In addition, the backup copy of the file needs to be an exact image of the original at a particular point in time. Copying a file is, however, not an instantaneous process and the time taken to copy will depend on the size of the file and the speed of the copying operation. This leads to a problem unless the backup application can be sure that no other application can modify the file during the copying process.

To copy a file, a backup application allocates an area of random access memory (RAM) as a transfer buffer and proceeds by alternately reading blocks of the source file into the buffer and then writing the buffer contents out to a secondary storage means. Unless the file is very small, the transfer buffer will fill up several times and the copying operation will require several read and write operations to make a complete copy of the file.

The potential problem caused by allowing the file to be modified during the copying process, may be illustrated by considering the example of a file which is being copied as a series of 10 blocks. If the file were to be modified by a transaction that required changes to the file which correspond to blocks 3 and 8 after blocks 1 to 5 had already copied, the copying process would subsequently copy the change to block 8 but would not copy the change to block 3 since this block had already been copied before the transaction occurred. The backup copy will therefore contain only a partial transaction which may make the backup copy entirely useless, since the application which "owns" it will probably consider the file to be corrupt.

My U.S. Pat. No. 5,086,502 discloses a method of backing up each write operation as it is made by making a duplicate write operation to a secondary storage means. In addition to this method, there are two other ways of backing up files on a computer system having shared storage means:

i) Lock the file while backing up. This prevents other users from modifying the file by denying them write access. If another user already has write access, the backup application must either skip that file or wait until exclusive write access can be obtained.

ii) Detect modifications to the file. After copying the file, the backup application can use the operating system to check if any modifications were made during the copy operation. If modifications were made, then the copy must be repeated or that file skipped.

Neither of the latter two methods provides an adequate solution since many files (particularly database files) are constantly in use. Furthermore, the two methods require users to be effectively locked out while the backup takes place. Additionally, few secondary storage devices and operating system combinations are capable of sustained transfer rates of more than 15 megabytes (Mb) per minute and therefore the time taken to copy a large file is significant.

A few application programs do address the problem by providing methods of safely backing up their own files in a shared environment, but the procedure for each is different. To back up the whole storage means, the backup application therefore needs to know how each different built-in procedure works or must rely on manual intervention at an appropriate point.

Thus, since a backup application must back up a whole file and since this must not be modified by another application program during the backup process, the use of prior backup methods will introduce delays into a computer system having shared storage means. This is particularly true while large files are backed up.

U.S. Pat. No. 5,163,148 to Walls describes a backup system in which, before backup of a file commences, the file is brought into a consistent state; for example, if multiple operations are required in connection with a transaction, then all these operations are completed. If a portion of a file being backed up requires updating, that portion of the original file is copied to a separate part of the disk before the updating takes place. The backup program backs up the file by substituting those portions that have been updated by the original portions that have been copied and retained elsewhere on the disk. The disk extent map, which normally holds a list of the track and sectors on the disk occupied by that file, is extended to include a concordance relating the track and sector locations of the copied, original file portions to the track and sector locations of the updated portions which occupy the areas from which they were copied.

My U.S. patent application Ser. No. 08/093,386 filed Jul. 19, 1993 (the earlier application) and corresponding international Patent Application No. PCT/GB94/01581, published as publication number WO95/19599, describe a method of operating a computer having a storage device shared between several application programs, which also comprises a backup process including a process for maintaining a record of changes made to the data on the storage device while the backup process is executing. The record is used to ensure that the data seen by the backup process does not change while it is executing while allowing other processes to continue to update the storage device normally, thereby avoiding delays associated with file locking techniques. The additional operations are executed at the level of the operating system interface of the microcomputer in such a manner that normal use of the computer is unaffected. In that method a backup process is operable to issue a start signal and a stop signal and to perform at least one backup read operation to read original data from the storage means, e.g. the hard disk. The central processing unit (CPU) performs at least one normal write operation to write data periodically to a primary area of the storage means, and at least one normal read operation to read data from the storage means.

After receiving said start signal, an interception operation is performed to intercept the write operation, and to write data to a secondary storage area of the storage means so as to preserve the original data which would otherwise be overwritten by the write operation. A record of the file portions written to the secondary area is maintained and, on performing one of the backup and normal read operations, the record is interrogated to read data from one of the primary and the secondary storage areas according to the record. In this way the backup process is provided with preserved original data in the state it was in before the start signal was issued. In this instance, however, the record defines the file portions in terms of file records and not in terms of track and sector locations on the disk. This avoids problems that can arise if the record is held in terms of disk location, i.e., track and sector, and provides certain advantages.

The record preferably comprises a delta area in which the first data is stored and a mapping reference between the actual location of the first data and its intended location. Alternatively the second data may be recorded in the delta area and other applications may continue to write to the intended location on the storage device.

The delta area is preferably a different area of the same storage device, e.g. hard disk. The additional operations required are advantageously stored and operated at an operating system interface level of the computer system. If the software is stored at the operating system level, it can be made transparent to the user so as not to affect application software.

This backup recording can be stored in a variety of storage means, for example a tape drive, optical disk, or in another area of the basic storage medium. Once the backup has been made it may be restored in conventional manner.

SUMMARY OF THE INVENTION

The present invention provides improvements which are applicable to the foregoing methods. First, it is a requirement that the system is able to distinguish read requests which originate from the backup program from read requests which originate from the other applications which may be running.

In a first aspect the present invention provides a method of operating a microprocessor-based computer system including an instruction memory, a central processing unit and a storage means, the method comprising the steps of: providing a backup process, running on the computer system, which is operable to issue a start signal and a stop signal and to issue at least one backup read instruction to read original data from the storage means; providing first instructions stored in the memory to the central processing unit to cause the central processing unit to perform at least one normal read operation to read data from the storage means; maintaining a record of data written to the storage means, to relate corresponding areas in a primary storage area of the storage means and a secondary storage area of the storage means; and after receiving the start signal on receiving a read instruction determining whether the read instruction relates to a backup read operation or a normal read operation, and on performing one of the backup and normal read operations, interrogating the record to read data from one of the primary and the secondary storage areas according to the record, and on performing the other of the backup and normal read operations, reading data from the primary storage area; the step of determining whether the read instruction relates to a backup read operation or a normal read operation comprising the step of looking at the area of memory from which the read instruction originates to determine the identity of the program which initiated the read instruction.

In a second alternative aspect of the invention there is provided a method of operating a microprocessor-based computer system including an instruction memory, a central processing unit and a storage means, in a computer network; the method comprising the steps of: providing a backup process, running on the computer system, which is operable to issue a start signal and a stop signal and to issue at least one backup read instruction to read original data from the storage means; providing first instructions stored in the memory to the central processing unit to cause the central processing unit to perform at least one normal read operation to read data from the storage means; maintaining a record of data written to the storage means, to relate corresponding areas in a primary storage area of the storage means and a secondary storage area of the storage means; and after receiving the start signal, on receiving a read instruction determining whether the read instruction relates to a backup read operation or a normal read operation, and on performing one of the backup and normal read operations, interrogating the record to read data from one of the primary and the secondary storage areas according to the record, and on performing the other of the backup and normal read operations, reading data from the primary storage area; and wherein the improvement comprises allocating to the backup process a unique user identification, whereby the step of determining whether the read instruction relates to a backup read operation or a normal read operation comprises determining whether the read operation is requested by a user with the said unique user identification.

A potential problem with the method of the earlier application is that it may be unable to provide the desired backup operation on a given file because that file is open to another application, such that access to the file by the backup process is denied by the operating system.

In a third aspect of the invention, which is preferably used in conjunction with the foregoing aspects of the invention, there is provided a method of operating a microprocessor-based computer system including an instruction memory, a central processing unit and a storage means, the method comprising the steps of: providing a backup process, running on the computer system, which is operable to issue a start signal and a stop signal and to perform at lest one backup read operation to read original data from the storage means; and providing instructions stored in the memory to the central processing unit to cause the central processing unit to perform at least one normal read operation to read data from the storage means; and providing file opening means for opening a file to be read by a normal read operation and denying access to the file by other read operations, wherein the improvement comprises providing means associated with the backup process which disables the denying function of the file opening means to permit simultaneous read access to the file by a backup read operation and a normal read operation.

Finally, while the backup method of the earlier application can cope with changes made to the file being backed up while the backup is in operation, the inventor has appreciated that there will be a problem if the file is in the process of being written to when the backup operation actually commences.

In a fourth aspect the invention provides a method of operating a microprocessor-based computer system including an instruction memory, a central processing unit and a storage means, the method comprising the steps of: providing a backup process, running on the computer system, which is operable to issue a start signal and a stop signal and to perform at least one backup read operation to read original data from the storage means; and providing instructions stored in said memory to said central processing unit to cause said central processing unit to perform at least one normal write operation to write data to the storage means; and in which the backup process is capable of operating with files which are open to access by the said instructions, wherein the improvement comprises the step of delaying the issue of a start signal until any series of write operations to a file to be backed up have been completed.

The invention will be described below by way of example with reference to the drawings.

DESCRIPTION OF THE PREFERRED EMBODIMENT OF THE INVENTION

Figure 1:
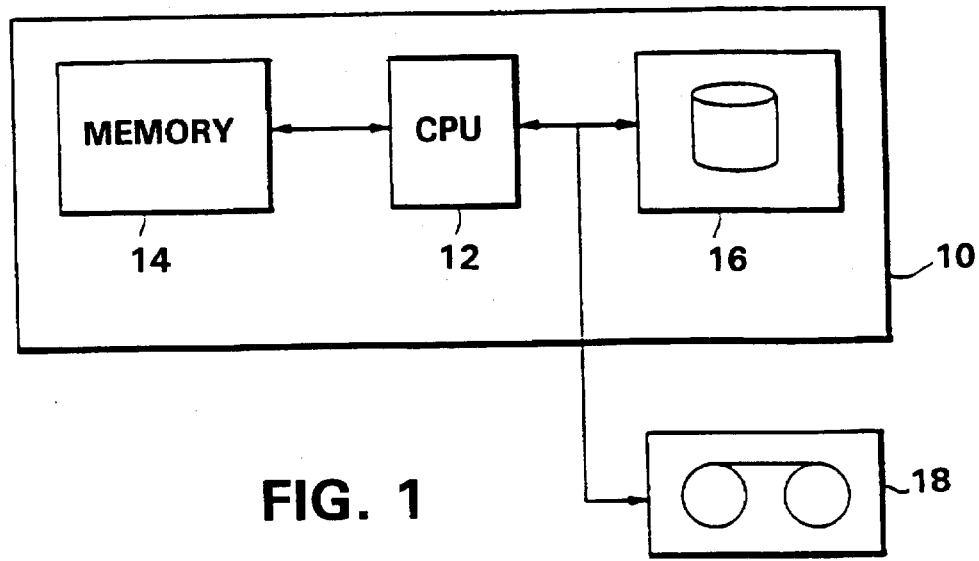
FIG. 1 is a block diagram of a personal computer and a cartridge tape drive.

Referring to FIG. 1 of the drawings, a personal computer 10 typically comprises a central processing unit 12, a random access memory 14, and a non-volatile storage device in the form of a hard disk drive 16. In this example, for the purpose of providing backup storage means, a tape unit 18 is coupled to the computer 10.

Part of a backup program application is formed at a recording process which operates to intercept normal read and write operations from and to the disk drive 16 respectively, in order to control the flow of data between the disk drive 16 and the other parts of the computer 10.

Before starting to make a backup copy of a file, the recording process is activated by the backup application to re-direct all disk write activity to another area of the disk 16 known as a "delta" area. A delta mapping table is maintained to provide a record of all disk write operations which have been re-directed to the delta area. This table maintains a mapping between the intended destination on the disk 16 of the data associated with each disk write operation, and its actual storage position in the delta area. If a subsequent write operation occurs to an area which is already the subject of an entry in the table, the old data in the delta area is allowed to be overwritten by the new data. In this way, the data on the main part of the disk does not change while a backup copy is being made, since all changes are re-directed to the delta area.

When a disk read operation is requested by the backup application, it is passed through unchanged so that the data returned to the backup application comes from the original data area on the main part of the disk. However, when a disk read operation is requested by another application, the recording process first operates to check the table to see if a disk write to that area has occurred since the process started intercepting write operations and, if so, the read operation is re-directed to the corresponding position in the delta area. If no write operation has occurred i.e. that piece of data has not been altered since the write operation interception started, then the read operation is passed through unchanged.

In this way, changes to data stored on the disk 16 are seen normally by all applications other than the backup application. The backup application sees data which will not change until an instruction is issued to stop the recording process intercepting read and write operations.

When the backup copying operation has finished, the recording process is activated to return the computer to normal operation. This restoration phase is achieved by applying the changes stored in the delta area to the appropriate original data areas in the main part of the disk 16 using the mappings stored in the table. While the delta changes are being applied, disk write operations continue to be intercepted as described above. When there are no more write operations which have not been applied to the original data area, the interception of write operations is halted and the system operates conventionally.

As a further improvement, if a record is kept of the extent to which the backup copying process has progressed, the software can allow write operations to the main part of the disk 16 to pass through unchanged after that part of the disk has been backed up since it will no longer matter if the data changes. This reduces the size of the delta mapping table. Also if the area on the main part of the disk to which that operation is directed was already the subject of an entry in the mapping table, that entry may then simply be deleted thereby reducing the time taken in the restoration phase.

Figure 2A:
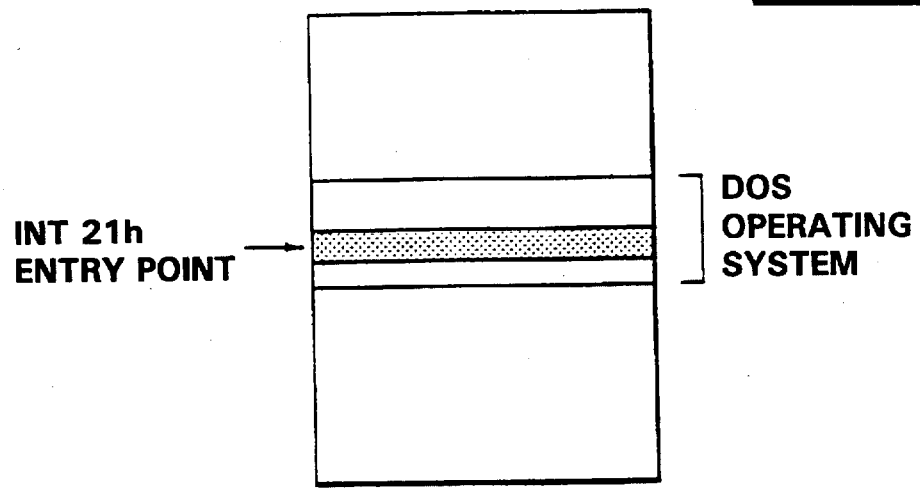
FIGS. 2A and 2B are diagrams illustrating a system memory map at the operating system level of a conventional personal computer and a computer modified to operate in accordance with the method of the invention respectively.
Figure 2B:
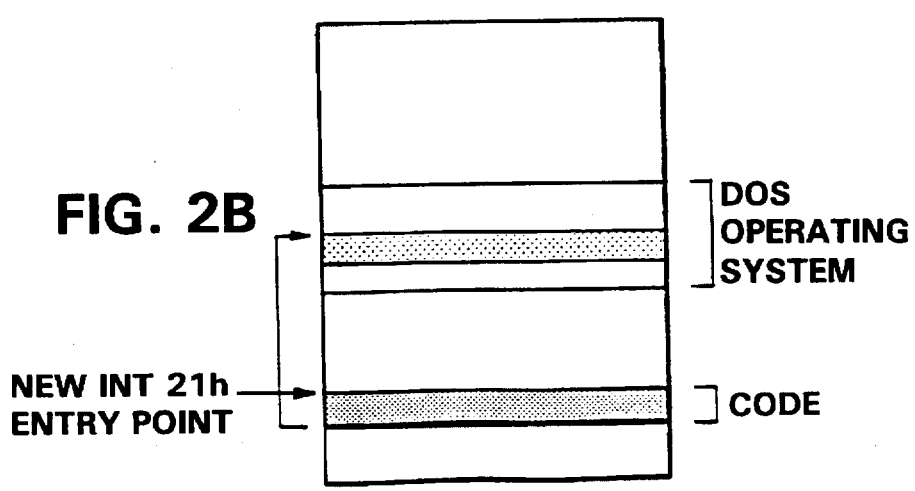

The invention is particularly applicable to IBM compatible personal computers, i.e. the majority of personal computers using as their central processor unit (CPU) processor chip types numbers 8086, 8088, 80286, 80386, 80486 and Pentium manufactured by Intel, and similar microprocessor based systems. In such computers, whenever a program wishes to access a file it calls a standard routine which writes data to the disk. This routine, which in the case of the DOS operating system is known as Interrupt 21 hex (INT 21h) is an integral part of the operating system. The action performed by the routine, known as the interrupt handler routine, depends on the parameters passed to the routine upon entry. This routine is shown in FIG. 2A as forming part of the operating system in a system memory map, the INT 21h entry point being shown by an arrow. To carry out a preferred method in accordance with the invention, additional program code is added at the operating system interface level as shown in FIG. 2B. In practice, in a DOS environment, this can be loaded into the computer as a device driver using the CONFIG.SYS file.

The added software has the effect of an instruction to write data being replaced by an alternative set of instructions. A similar technique may be used to intercept an instruction to read data from the disk and to replace this also with an alternative set of instructions.

Figure 3:
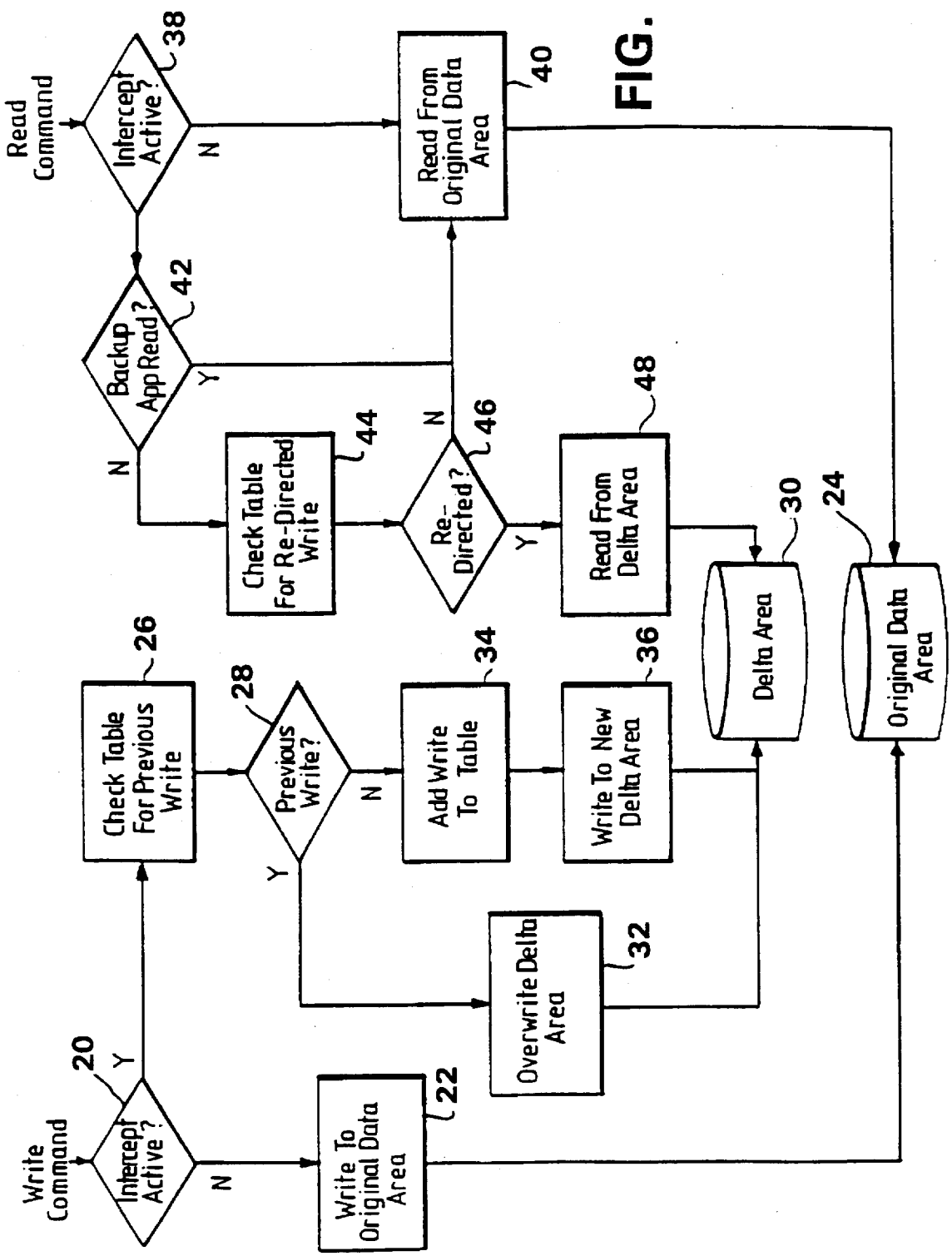
FIG. 3 is a flow chart of a method for recording data in a backup operation.

The relevant sequence of operations provided by the alternative set of instructions is shown in the flow chart of FIG. 3. On receipt of an INT 21h call, the program first checks to determine whether the call is a write call. If it is, the program checks in step 20 to see if it is supposed to be intercepting write calls. If not, data is written (step 22) to the original data area 24.

If write calls are being intercepted, then the program checks the delta mapping table (step 26) to see if a write has previously been made to that area of the original file 24, defined in terms of specified records or portions in the file. If (step 28) a write has been made previously, then that part of the delta area 30 previously mapped to that part of the original file 24 in the delta mapping table, is overwritten with the new data (step 32).

If write calls are being intercepted but a write has not previously been made to that part of the original file 24, then the write is added to the table and a new area of the delta area is allocated to that piece of data (step 34). The data is then written to the new delta area (step 36).

If the call is a read call, the program checks in step 38 whether it is supposed to be intercepting read calls. If it is not, then data is read from the original file 24 (step 40).

If the program is intercepting read calls, then it first checks in step 42 to see if the call came from the backup application program. If the call did come from the backup application, the program passes to step 40 and data is read from the original file 24.

If the read call did not come from the backup application, the program checks the delta mapping table to see if a write to the area of the original file 24 corresponding to that of the read call, has been re-directed to the delta area (step 44). If it has not been re-directed (step 46) the program passes back to step 40 and the data is read from the original file 24. If the read has been re-directed, the data is read from the correct part of the delta area 30 (step 48).

If the INT 21h call is neither a write call nor a read call, then it is returned to the normal INT 21h handling routine.

In a second embodiment of the invention, when read and write operations are being intercepted during the recording process, instead of storing the changed data in the delta area, when the first write to a particular area of a file is made, the original data is stored in the delta area and the original file is allowed to be changed. An entry is made in the mapping table which points to the original contents of that area of the original file which is now stored in the delta area. Any subsequent write to the same area of the file is then ignored by the recording process. Read requests from the backup application are then re-directed to the delta area if the mapping table indicates that area of the original file has been overwritten.

Figure 4:
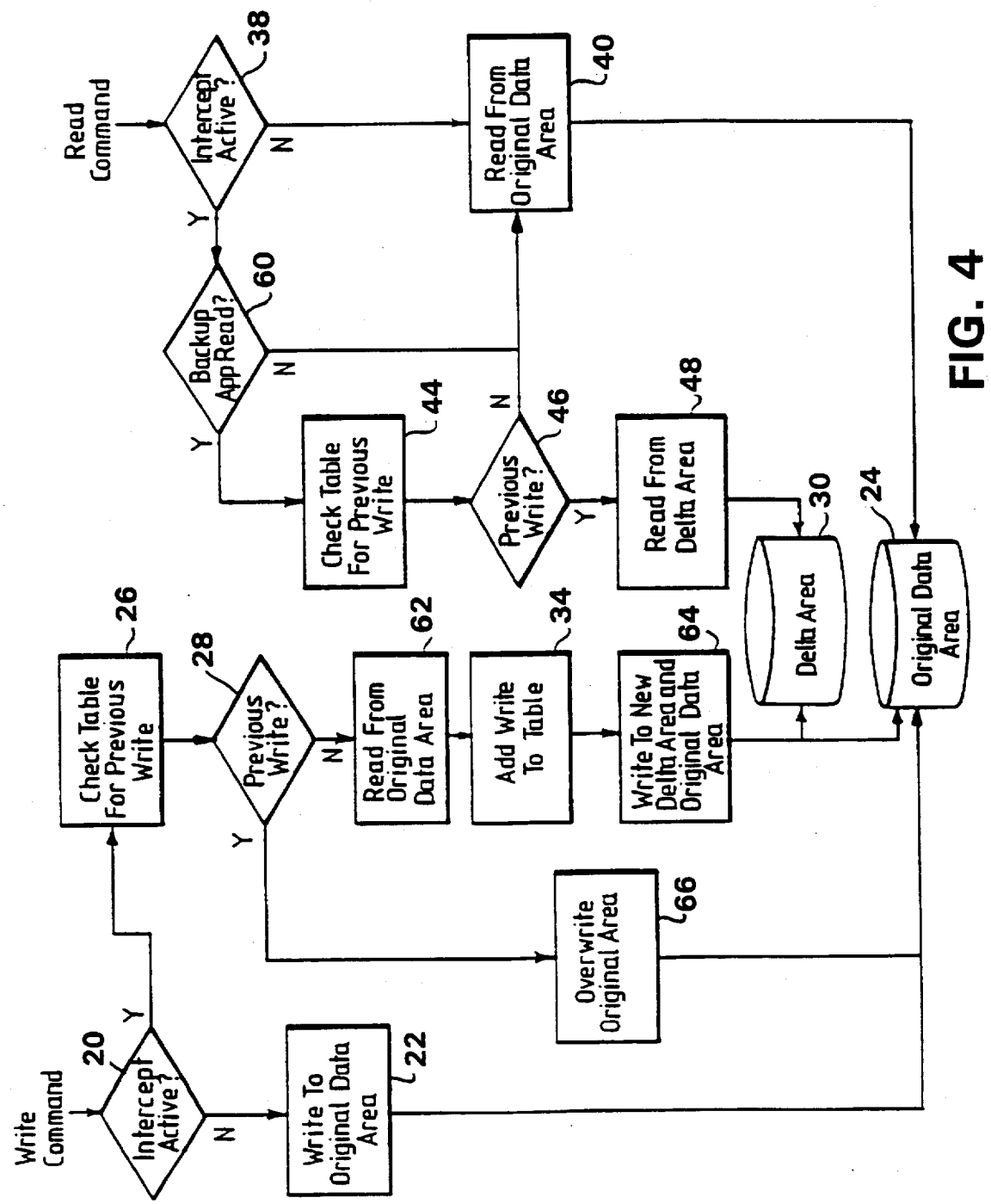
FIG. 4 is a flow chart of a second embodiment of the method of FIG. 3.

In FIG. 4, the second embodiment is represented in a flow-chart. The chart is similar to that of FIG. 3 with steps having the same reference numeral denoting a similar action.

The differences between the two figures (3 and 4) are as follows:

In step 60, if read intercept is active (step 38) and the read is not from the backup application, the data is read from the original data area. This is the reverse of step 42 in FIG. 3.

An extra step 62 is inserted after step 28 which reads data from the original data area before it is overwritten for the first time.

Step 36 of FIG. 3 is modified to form new step 64 which incorporates an additional write to the delta area of the data read in step 62.

Step 32 is modified to form new step 66 which no longer redirects the data to overwrite the delta area but instead writes the data to over the original data area.

This second method is slower than the first since each file write request becomes a read and two writes as opposed to the single re-directed write of the first method. However the second method does not require the changes stored in the delta area to be applied to the original file once the backup is complete. The delta mapping table and the data stored in the delta area may simply be discarded. Additionally because of this difference, provision does not need to be made to recover from a fatal condition (such as a power failure) occurring when the delta changes have not been fully applied to the original data.

In the case where the method described above forms part of a backup application, the interception of read operations can take place within the backup application and need not involve the use of an operating system routine.

The detailed implementation of a system as described with reference to FIGS. 3 and 4 is within the competence of the skilled man in the art, and a full description thereof is not necessary. If implemented in MS.DOS, the reader is referred to the IBM DOS Technical Reference Manual for background material, if required. The disclosure of this Manual is hereby incorporated in this specification by reference.

The invention is preferably implemented as part of the operating system itself, either by being an integral part of the original operating system code, or by forming an extension to it, in the form of a device driver. In the case of Intel 80386 (and higher) CPU's the invention would typically operate at the highest privilege level, known as "Ring 0", where access to all elements in the system is unrestricted.

However, the invention does not rely on any particular CPU architecture in order to operate. It can readily be implemented on other systems, for example on Macintosh computers which use 68000 and PowerPC series CPUs.

The invention can be used in a multi-user environment. In this case it is preferred that the invention is used in an environment with file access control. The invention will ensure that an incorrupt backup copy is made, while the remainder of the system effectively operates entirely as it would as if the invention were not present. In the absence of file access control there is a danger of file corruption, regardless of whether the invention is in use or not.

The invention is particularly applicable to files generated by databases, such as dbase, for example, which can be large and are divided into records. The records that are updated are recorded in the table and both updated and original versions of the record are maintained until the backup is completed. The table may contain, for example, the starting point in the file at which the updated data starts and a length value corresponding to the quantity of data that is updated. Alternatively the table may contain an identification in terms of the identity of the updated records.

In a multi-user or network situation, when the computer environment permits the identification of a particular user who wishes to perform a backup, the method may also include the steps of recognizing the user and only backing up that user's files in the way described above. In this way it is not necessary to intercept all data transactions but only those relating to that user.

ReQuest Source Identification

The backup methods described above which are capable of operating on files which are open rely on the ability to distinguish between read requests originating from the backup application and those originating from other sources, i.e. normal applications. This arises in step 42 in FIG. 3 or step 60 in FIG. 4.

Provided the open file method is provided as an integral part of the backup application, the source of read requests can be readily determined, since the backup application 'knows' which requests it issues. However a problem arises if the backup application already exists, for example in the form of a standard off-the-shelf package or otherwise in a form in which it cannot be altered to accommodate the open-file method, which has instead to be implemented by additional code.

In accordance with a first improvement, requests from the backup application are distinguished from other requests by tracing the chain of events (i.e. looking back or "upwards") to identify the area of code which initiated the read request. In the following example of such a method the MS.DOS operating system will again be used by way of illustration; however, similar techniques can be applied to other operating system environments.

The read request is initiated by an INT 21h call, which would normally go direct routine. The interrupt handler routine. The interrupt handler routine generally has no knowledge of the caller. It is simply told to execute a particular function and then return to the caller. In the Intel CPUs mentioned above which are used in DOS environments, the CPU automatically places the return address of the caller on the "stack", and jumps to the first instruction of the interrupt routine. When the function has been carried out, the interrupt handler issues an IRET (interrupt return) instruction which causes the CPU to retrieve the return address from the stack and continue execution at the return address. Thus the interrupt handler need have and indeed has no knowledge of the caller.

In the systems described above with reference to FIGS. 3 and 4, the INT 21h interrupt routine is replaced by an alternative set of instructions. In addition to the functions described in the foregoing, these instructions can be adapted to additionally determine the source of the request, as follows.

In this improvement the interrupt handler examines the stack to determine the return address. In the case of 80X86 series Intel CPUs the code offset and segment of the caller will be stored as the first and second words on the top of the stack, i.e. at SS:[SP] and SS:[SP+2] respectively. An outline of the steps involved in an MS.DOS implementation of this improvement is given as an Appendix to this description.

The routine can then look at the source of the call, as defined by the stack, and determine the program which made the call in a number of possible ways, of which the following are examples:

(i) Since the code in each version of an off-the-shelf program is the same, various characteristics of the code around the return address can be examined to determine if the caller is a known backup program. The code around the return address is compared with the code expected from the backup program which is being used, to determine whether there is a match indicating that the call has been made by the backup program.

(ii) Alternatively, the program name can be established by reference to the Program Segment Prefix (PSP) and Environment String associated with each loaded program. From the stack the segment is known and the PSP can be read. This will allow the environment string to be located, and hence the program name. This technique is fully described in the textbook "Undocumented DOS" by Andrew Schulman et al, pub. Addison-Wesley, 2nd Ed. 1993, ISBN 0-201-63287-X, see Chapter 7, especially pages 356–359. The disclosure of this book is hereby incorporated by reference.

In the case of operating systems other than MS.DOS, the identity of the caller may be determined from ocher parameters on the stack, including connection numbers, task identity numbers, process numbers and the like. In certain operating systems, global variables may also be used to establish the name of the process.

The method relies on identifying some known characteristic of the caller, such as program name, process (or thread) name, or by identifying some 'signature' in the program code, which may be a known sequence of bytes, by looking back at the caller program via the stack.

In accordance with a second improvement which can be used in a network server environment, the caller program's identity is determined by reserving a particular user name for backup purposes only. Instead of establishing the identity of the program, the name of the user (unique user identification) is identified, and all requests from the reserved user are assumed to come from a backup program. Since every user is required to log-in to a server before access to files is granted, this is an effective method, provided of course that the user name is always used for backup, and not for any other purpose. This method does not require advance knowledge of the particular backup program.

In a similar way, the process or task identification specific to the backup process may be interrogated to determine whether it is the backup process or another application which is requesting the read. Two tasks with the same identification (id) never exist at the same time, so they uniquely identify the processes at any instant (though task numbers are re-used).

The foregoing has been described as applying to read requests, but it is possible also to apply the same procedure to write requests. In the event that the backup program issues a write request then appropriate action can be taken, which will normally involve some error routine, as the backup application should not normally be issuing write requests to the interrupt handler.

As described above, the additional instructions first look to see whether the interrupt call is a read (or write) request, and if it is, look to see whether the request was issued by the backup program or by another application. In principle the order of these two operations could however be reversed, and the source of the call determined first before the nature of the call is examined.

Guaranteed File Access

The open file backup method described with reference to FIGS. 3 and 4 assumes that read access to files can always be obtained by the backup application. In practice, this may not always be the case, since the file may already have been opened for exclusive read/write use by another application, and thus access may be denied to the backup application.

The present inventor has appreciated that since a backup application should never write to files it is backing up, and because the open-file method described above will ensure that the copy of the file received by the backup application will not change while it is backed up, it is in fact entirely safe for the backup application to have read access to the file.

Access for backup purposes can be provided as follows. Operating systems generally maintain a table of all open files, which includes such information as file handle identifiers, current file offset pointers, and access rights held for each open file.

In the case of the MS.DOS operating system, files are opened using the INT 21h function. Thus file open requests can be identified by an addition to the same alternative set of instructions as described above. By using the request source identification techniques described in the previous section, or by direct instruction from the backup program, it can be established that the file open request was made by the backup application, and if so, the table of open files can be temporarily manipulated to ensure that file access is granted, even if it would normally be disallowed. Once access has been granted, but before the interrupt handler returns, the table is restored to its former state, such that subsequent requests from other applications will be refused access as normal. Read requests from the backup application will then be satisfied, even though the original application believes it has exclusive use of the file.

In MS.DOS the table of open files is known as the System File Table (SFT). The SFT is a table containing an entry for each open file. Each entry contains the access mode granted for file access. The additional instructions which are necessary modify the SFT when the backup application requires access to an open file, by temporarily altering the appropriate SFT entry to give the impression that access rights which would normally prevent access by the backup program have not already been granted. Access will then be allowed and a 'file handle' allocated. Before returning to the caller, the access rights in the SFT entry are returned to their original state.

The System File Table (SFT) is fully described in the textbook "Undocumented DOS" referred to above, see Chapter 8, pages 465–469 and 490–494. Specifically, in the case of the DOS operating system, the steps required in the INT 21h interrupt handler to guarantee access to the backup application are shown in FIG. 5.

Figure 5:
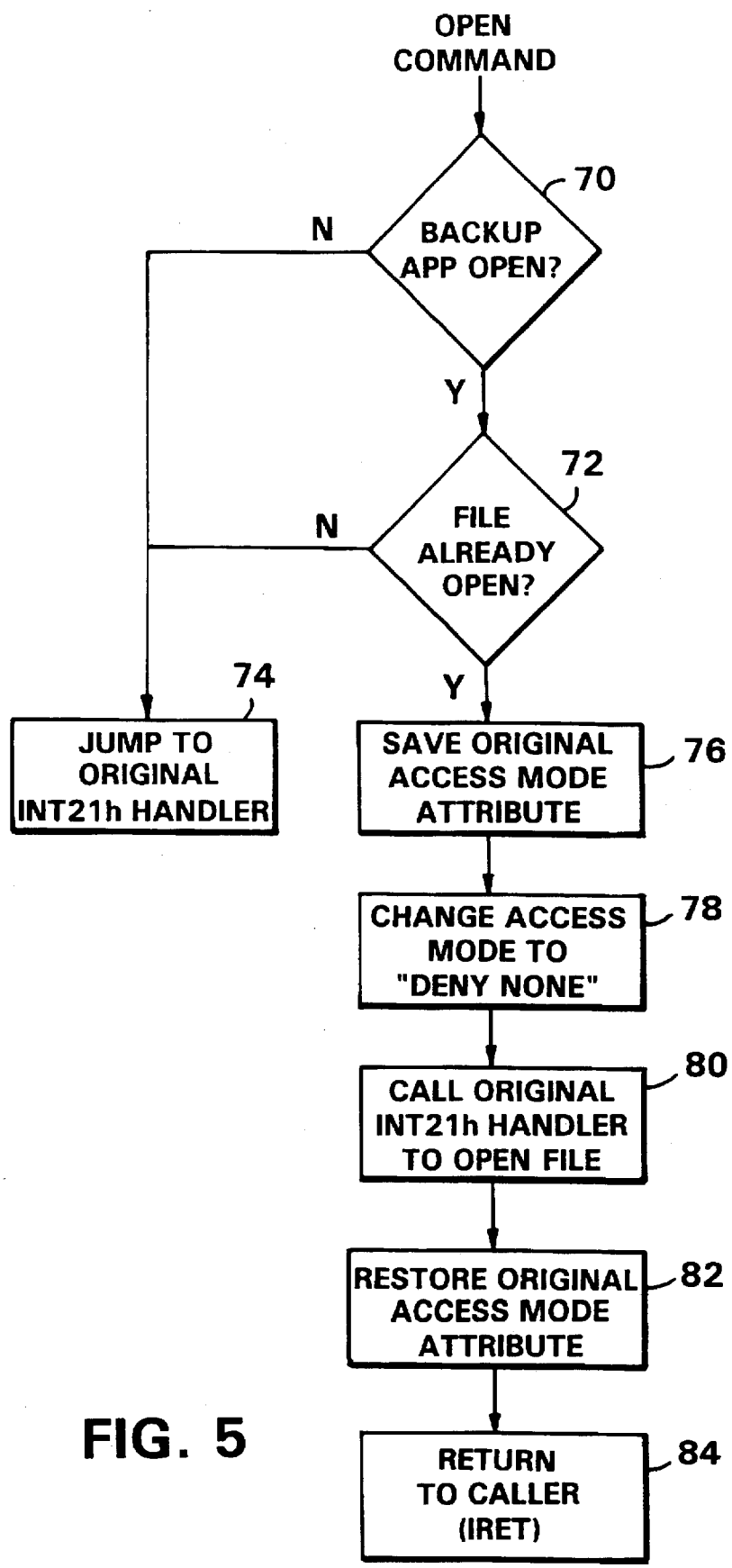
FIG. 5 is a flow chart illustrating an improvement to the embodiments described with reference to FIGS. 3 and 4.

Referring to FIG. 5, upon receipt of a file open command as an INT 21h call, in step 70 a determination is made as no the source of the request, using one of the techniques described in the preceding section. If it is, a determination is then made in step 72 as to whether the file to which access is required is already open. If the answer to either of these questions is NO, then the program returns to the normal INT 21h handler routine, step 74. If the answer to both questions is YES, then the special code described in FIG. 5 is executed.

This proceeds as follows. Each entry in the SFT contains the access mode granted to the requesting process ('Access Mode Attribute'). In step 76, the current or original Access Mode Attribute of the appropriate entry in the SFT is saved. In step 78, the Access Mode Attribute is then changed to a 'Deny None' state, so that effectively the SFT is rendered inoperative in that it does not stop multiple access to the open file. Now the normal INT 21h interrupt handler can be called in step 80 in order to open the file for the backup program in the normal way. When the backup program has finished with the file, the original, previously-stored, access mode attribute is put back into the SFT (step 82). Finally the execution is returned to the calling program using the IRET instruction, which reads the stack (step 84).

The steps given in the Appendix assume that this improvement, providing guaranteed file access, is being used.

The precise manner in which the SFT is altered is not important, and various methods could be used. The preferred method manipulates the sharing fields "share_prev_sft" and "share_net_machine" (see Undocumented DOS, page 478). By manipulating these fields, for example by changing a "deny read" value to "deny none", access can be caused to be granted to the backup program. Alternatively, parts of the SHARE utility, which is part of MS.DOS, could be changed so that access is granted (see op. cit. pages 490–494).

A similar method would be used in other operating system environments, for example Novell NetWare.

Establishing 'Good' State

The open-file backup method described above with reference to FIGS. 3 and 4 ensures that a file opened for backup does not change while the backup is in progress. It does not however establish that the file is in a 'good' state at the instant backup begins. For example, another application could be writing a transaction which involves a series of write operations, some of which have been performed and some of which have not. Because the backup method operates on open files, it is therefore possible for the backup application to receive a copy of the file containing a partial transaction.

The inventor has appreciated that by delaying the file open request from a backup application until such time as it can be determined that a transaction is not in progress, a 'good state' backup copy of the file can be assured. Since most network operating systems are by their very nature multi-threaded, that is designed to run more than one process at a time, and the ability to delay one process while another completes is a common facility of such operating systems, this can be readily achieved. It generally does not matter if a backup operation is held up for a short time, since users are not usually dependent on its completion, particularly if files can be backed up while open. The delay in the file open request corresponds to delaying the start signal which commences execution of the routines described with reference to FIGS. 3 and 4.

The following describes two methods of ensuring the file is in a transactionally 'good state' at the time backup begins.

The first method is applicable to operating systems, including Novell NetWare for example, which provide means for an application to ensure that a given transaction is applied to files either completely, or not at all. Under Novell NetWare, this facility is known as the Transaction Tracking System (TTS). Under such operating systems, the current transactional status can be obtained from operating system variables or tables, such that it can be determined if a transaction is 'in progress' or not.

The second method is applicable where no integral facility for maintaining transactional integrity is available. Then an alternative method of establishing transactional integrity can be used, as follows. Transactions typically occur over a relatively short period of time, with longer time gaps occurring between transactions. An application program will generally carry out all the write operations required for a single transaction in rapid succession, since there is otherwise the danger that a power failure or similar fatal problem will cause disk data to contain a partial transaction which, when the system is re-started will be manifested as a corrupt file. Clearly the shorter the period over which the transaction is written to disk, the less likely an unconnected fatal problem (such as power failure) will occur during that transaction. By measuring the time period between successive write operations, it is possible to make a value judgement as to the transactional state of a file. For example, if no writes have occurred in, say, the last minute, it is highly unlikely that an application is part-way through writing a single transaction. By empirically adjusting the inactivity time period to the characteristics of applications, a highly reliable indicator of transactional integrity can be established.

There are thus described various improvements to the methods illustrated with reference to FIGS. 3 and 4, namely various techniques for request source identification, a technique for ensuring guaranteed file access, and techniques for ensuring that the file being backed up is in a 'good' state before backup takes place. These various improvements are preferably used in combination. However, they can be used selectively and independently, and it is not necessary that they should all be implemented simultaneously in the same application.

The invention has been described primarily in terms of the DOS operating system, more particularly MS.DOS. However, the invention does not rely on any particular CPU architecture in order to operate. In particular, it is not limited to DOS operating systems, and could be implemented in Novell NetWare, OS/2, or UNIX, and on Macintosh computers which use 6800 and PowerPC series CPUs.

APPENDIX

Sample Backup Program Code:

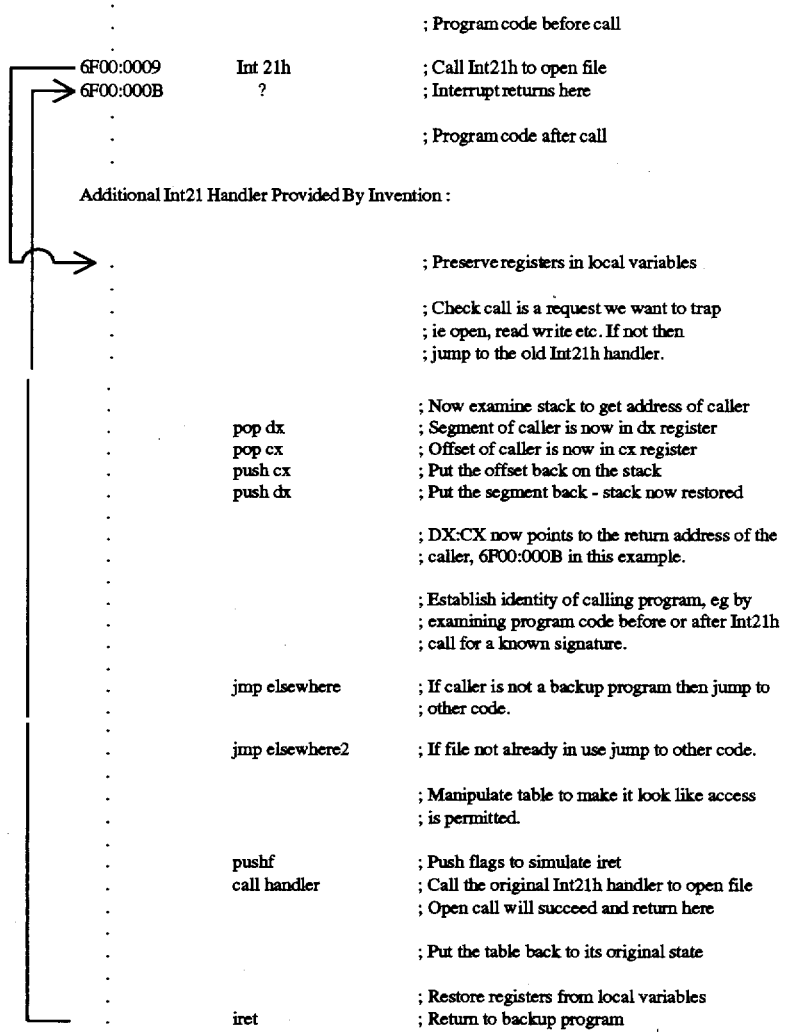

```
                                          ; Program code before call
    6F00:0009        Int 21h              ; Call Int21h to open file
    6F00:000B        ?                    ; Interrupt returns here
                                          ; Program code after call Additional Int21 Handler Provided By Invention :

; Preserve registers in local variables

; Check call is a request we want to trap
                                          ; ie open, read write etc. If not then
                                          ; jump to the old Int21h handler.

; Now examine stack to get address of caller
                     pop dx               ; Segment of caller is now in dx register
                     pop cx               ; Offset of caller is now in cx register
                     push cx              ; Put the offset back on the stack
                     push dx              ; Put the segment back - stack now restored ; DX:CX now points to the return address of the
                                          ; caller, 6F00:000B in this example.

; Establish identity of calling program, eg by
                                          ; examining program code before or after Int21h
                                          ; call for a known signature.

jmp elsewhere        ; If caller is not a backup program then jump to
                                          ; other code.

jmp elsewhere2       ; If file not already in use jump to other code.

; Manipulate table to make it look like access
                                          ; is permitted.

pushf                ; Push flags to simulate iret
                     call handler         ; Call the original Int21h handler to open file
                                          ; Open call will succeed and return here ; Put the table back to its original state ; Restore registers from local variables
                     iret                 ; Return to backup program
```

I claim:

1. A method of operating a microprocessor-based computer system including an instruction memory, a central processing unit and a storage means; the method comprising the steps of:

providing a backup process, running on said computer system, which is operable to issue a start signal and a stop signal and to issue at least one backup read instruction to read original data from said storage means;

delaying the issue of a start signal until any series of write operations to a file to be backed up have been completed;

providing first instructions stored in said memory to said central processing unit to cause said central processing unit to perform at least one normal read operation to read data from said storage means, said backup process being capable of operating with files which are open to access by said instructions;

providing file opening means for opening a file to be read by a normal read operation and having a denying function for denying access to said file by other read operations;

disabling said denying function of said file opening means to permit simultaneous read access to said file by a backup read operation and a normal read operation;

maintaining a record of data written to said storage means, to relate corresponding areas in a primary storage area of said storage means and a secondary storage area of said storage means;

determining, after receiving said start signal and on receiving a read instruction, whether said read instruction relates to a backup read operation or a normal read operation, and on performing one of said backup and normal read operations, interrogating said record to read data from one of said primary and said secondary storage areas according to said record, and on performing the other of said backup and normal read operations, reading data from said primary storage area; and wherein the step of determining whether the read instruction relates to a backup read operation or a normal read operation comprises the step of looking at the area of memory from which said read instruction originates to determine the identity of the program which initiated said read instruction.

2. A method of operating a microprocessor-based computer system including an instruction memory, a central processing unit and a storage means, in a computer network; the method comprising the steps of:

providing a backup process, running on said computer system, which is operable to issue a start signal and a stop signal and to issue at least one backup read instruction to read original data from said storage means;

delaying the issue of a start signal until any series of write operations to a file to be backed up have been completed;

providing first instructions stored in said memory to said central processing unit to cause said central processing unit to perform at least one normal read operation to read data from said storage means, said backup process being capable of operating with files which are open to access by said instructions;

providing file opening means for opening a file to be read by a normal read operation and having a denying function for denying access to said file by other read operations;

disabling said denying function of said file opening means to permit simultaneous read access to said file by a backup read operation and a normal read operation;

maintaining a record of data written to said storage means, to relate corresponding areas in a primary storage area of said storage means and a secondary storage area of said storage means;

determining, after receiving said start signal and on receiving a read instruction, whether said read instruction relates to a backup read operation or a normal read operation, and on performing one of said backup and normal read operations, interrogating said record to read data from one of said primary and said secondary storage areas according to said record, and on performing the other of said backup and normal read operations, reading data from said primary storage area; and allocating to said backup process a user, process or task identification, said step of determining whether said read instruction relates to a backup read operation or a normal read operation comprising determining whether said read operation is requested by a user or program with said user, process or task identification.

3. A method of operating a microprocessor-based computer system including an instruction memory, a central processing unit and a storage means, the method comprising the steps of:

providing a backup process, running on said computer system, which is operable to issue a start signal and a stop signal and to issue at least one backup read instruction to read original data from said storage means;

providing first instructions stored in said memory to said central processing unit to cause said central processing unit to perform at least one normal read operation to read data from said storage means;

maintaining a record of data written to said storage means, to relate corresponding areas in a primary storage area of said storage means and a secondary storage area of said storage means; and determining, after receiving said start signal and on receiving a read instruction, whether said read instruction relates to a backup read operation or a normal read operation, and on performing one of said backup and normal read operations, interrogating said record to read data from one of said primary and said secondary storage areas according to said record, and on performing the other of said backup and normal read operations, reading data from said primary storage area;

wherein the step of determining whether said read instruction relates to a backup read operation or a normal read operation comprises the step of looking at the area of memory from which said read instruction originates to determine the identity of the program which initiated said read instruction.

4. A method as claimed in claim 3, in which said looking step comprises interrogating a stack to determine locations stored on the stack and interrogating said locations.

5. A method as claimed in claim 4, in which said looking step comprises comparing code around said locations with code expected from the backup program.

6. A method as claimed in claim 4, in which said looking step comprises determining a Program Segment Prefix and an Environment String associated with the program at said locations, and determining the program name using said Environment String.

7. A method of operating a microprocessor-based computer system including an instruction memory, a central processing unit and a storage means, in a computer network; the method comprising the steps of:

providing a backup process, running on said computer system, which is operable to issue a start signal and a stop signal and to issue at least one backup read instruction to read original data from said storage means;

providing first instructions stored in said memory to said central processing unit to cause said central processing unit to perform at least one normal read operation to read data from said storage means;

maintaining a record of data written to said storage means, to relate corresponding areas in a primary storage area of said storage means and a secondary storage area of said storage means; and determining, after receiving said start signal and on receiving a read instruction, whether said read instruction relates to a backup read operation or a normal read operation, and on performing one of said backup and normal read operations, interrogating said record to read data from one of said primary and said secondary storage areas according to said record, and on performing the other of said backup and normal read operations, reading data from said primary storage area; and wherein the improvement comprises allocating to said backup process a user, process or task identification, whereby said step of determining whether the read instruction relates to a backup read operation or a normal read operation comprises determining whether said read operation is requested by a user or program with said user, process or task identification.

8. A method of operating a microprocessor-based computer system including an instruction memory, a central processing unit and a storage means, said method comprising the steps of:

providing a backup process, running on the computer system, which is operable to issue a start signal and a stop signal and to perform at lest one backup read operation to read original data from said storage means; and providing instructions stored in said memory to said central processing unit to cause said central processing unit to perform at least one normal read operation to read data from said storage means; and providing file opening means for opening a file to be read by a normal read operation and denying access to said file by other read operations;

wherein the improvement comprises providing means associated with said backup process which disables said denying function of said file opening means to permit simultaneous read access to said file by a backup read operation and a normal read operation.

9. A method as claimed in claim 8, in which said computer system maintains a table of open files, and in which the denying function is disabled by temporarily reversibly altering the table.

10. A method of operating a microprocessor-based computer system including an instruction memory, a central processing unit and a storage means, the method comprising the steps of:

providing a backup process, running on said computer system, which is operable to issue a start signal and a stop signal and to perform at least one backup read operation to read original data from said storage means; and providing instructions stored in said memory to said central processing unit to cause said central processing unit to perform at least one normal write operation to write data to said storage means; and in which said backup process is capable of operating with files which are open to access by said instructions, wherein the improvement comprises the step of delaying the issue of a start signal until any series of write operations to a file to be backed up have been completed.

11. In a microprocessor-based computer system including an instruction memory, a central processing unit and a storage means; a backup system comprising:

a backup program, for running on said computer system, which is operable to issue a start signal and a stop signal and to issue at least one backup read instruction to read original data from said storage means;

means for delaying the issue of a start signal until any series of write operations to a file to be backed up have been completed;

means for providing first instructions stored in said memory to said central processing unit to cause said central processing unit to perform at least one normal read operation to read data from said storage means, said backup program being capable of operating with files which are open to access by said instructions;

file opening means for opening a file to be read by a normal read operation and having a denying function for denying access to said file by other read operations;

means for disabling said denying function of said file opening means to permit simultaneous read access to said file by a backup read operation and a normal read operation;

means for maintaining a record of data written to said storage means, to relate corresponding areas in a primary storage area of said storage means and a secondary storage area of said storage means;

means for determining, after receiving said start signal and on receiving a read instruction, whether said read instruction relates to a backup read operation or a normal read operation, and on performing one of said backup and normal read operations, interrogating said record to read data from one of said primary and said secondary storage areas according to said record, and on performing the other of said backup and normal read operations, reading data from said primary storage area; and wherein the means for determining whether the read instruction relates to a backup read operation or a normal read operation comprises means for looking at the area of memory from which said read instruction originates to determine the identity of the program which initiated said read instruction.

12. In a computer network, a microprocessor-based computer system including an instruction memory, a central processing unit and a storage means; the microprocessor-based computer system comprising:

a backup program, for running on said computer system, which is operable to issue a start signal and a stop signal and to issue an least one backup read instruction to read original data from said storage means;

means for delaying the issue of a start signal until any series of write operations to a file to be backed up have been completed;

means for providing first instructions stored in said memory to said central processing unit to cause said central processing unit to perform at least one normal read operation to read data from said storage means, said backup program being capable of operating with files which are open to access by said instructions;

file opening means for opening a file to be read by a normal read operation and having a denying function for denying access to said file by other read operations;

means for disabling said denying function of said file opening means to permit simultaneous read access to said file by a backup read operation and a normal read operation;

means for maintaining a record of data written to said storage means, to relate corresponding areas in a primary storage area of said storage means and a secondary storage area of said storage means;

means for determining, after receiving said start signal and on receiving a read instruction, whether said read instruction relates to a backup read operation or a normal read operation, and on performing one of said backup and normal read operations, interrogating said record to read data from one of said primary and said secondary storage areas according to said record, and on performing the other of said backup and normal read operations, reading data from said primary storage area; and means for allocating to said backup program a user, process or task identification, said means for determining whether said read instruction relates to a backup read operation or a normal read operation comprising means for determining whether said read operation is requested by a user or program with said user, process or task identification.

13. In a microprocessor-based computer system including an instruction memory, a central processing unit and a storage means, a backup system comprising:

a backup program, for running on said computer system, which is operable to issue a start signal and a stop signal and to issue at least one backup read instruction to read original data from said storage means;

means for providing first instructions stored in said memory to said central processing unit to cause said central processing unit to perform at least one normal read operation to read data from said storage means;

means for maintaining a record of data written to said storage means, to relate corresponding areas in a primary storage area of said storage means and a secondary storage area of said storage means; and means for determining, after receiving said start signal and on receiving a read instruction, whether said read instruction relates to a backup read operation or a normal read operation, and on performing one of said backup and normal read operations, interrogating said record to read data from one of said primary and said secondary storage areas according to said record, and on performing the other of said backup and normal read operations, reading data from said primary storage area;

wherein the means for determining whether said read instruction relates to a backup read operation or a normal read operation comprises means for looking at the area of memory from which said read instruction originates to determine the identity of the program which initiated said read instruction.

14. A system as claimed in claim 13, in which said looking means comprises means for interrogating a stack to determine locations stored on the stack and interrogating said locations.

15. A system as claimed in claim 14, in which said looking means comprises means for comparing code around said locations with code expected from the backup program.

16. A system as claimed in claim 14, in which said looking means comprises means for determining a Program Segment Prefix and an Environment String associated with the program at said locations, and determining the program name using said Environment String.

17. In a computer network, a microprocessor-based computer system including an instruction memory, a central processing unit and a storage means; the microprocessor-based computer system comprising:

a backup program, for running on said computer system, which is operable to issue a start signal and a stop signal and to issue at least one backup read instruction to read original data from said storage means;

means for providing first instructions stored in said memory to said central processing unit to cause said central processing unit to perform at least one normal read operation to read data from said storage means;

means for maintaining a record of data written to said storage means, to relate corresponding areas in a primary storage area of said storage means and a secondary storage area of said storage means; and means for determining, after receiving said start signal and on receiving a read instruction, whether said read instruction relates to a backup read operation or a normal read operation, and on performing one of said backup and normal read operations, interrogating said record to read data from one of said primary and said secondary storage areas according to said record, and on performing the other of said backup and normal read operations, reading data from said primary storage area; and wherein the improvement comprises means for allocating to said backup program a user, process or task identification, whereby said means for determining whether the read instruction relates to a backup read operation or a normal read operation comprises means for determining whether said read operation is requested by a user or program with said user, process or task identification.

18. In a microprocessor-based computer system including an instruction memory, a central processing unit and a storage means, a backup system comprising:

a backup program, for running on the computer system, which is operable to issue a start signal and a stop signal and to perform at lest one backup read operation to read original data from said storage means; and means for providing instructions stored in said memory to said central processing unit to cause said central processing unit to perform at least one normal read operation to read data from said storage means; and file opening means for opening a file to be read by a normal read operation and denying access to said file by other read operations;

wherein the improvement comprises means associated with said backup program for disabling said denying function of said file opening means to permit simultaneous read access to said file by a backup read operation and a normal read operation.

19. A system as claimed in claim 18, in which said computer system maintains a table of open files, and in which the denying function is disabled by temporarily reversibly altering the table.

20. In a microprocessor-based computer system including an instruction memory, a central processing unit and a storage means, a backup system comprising:

a backup program, for running on said computer system, which is operable to issue a start signal and a stop signal and to perform at least one backup read operation to read original data from said storage means; and means for providing instructions stored in said memory to said central processing unit to cause said central processing unit to perform at least one normal write operation to write data to said storage means; and in which said backup program is capable of operating with files which are open to access by said instructions, wherein the improvement comprises means for delaying the issue of a start signal until any series of write operations to a file to be backed up have been completed.

* * * * *